US006240469B1

(12) United States Patent
Ishibashi

(10) Patent No.: US 6,240,469 B1
(45) Date of Patent: *May 29, 2001

(54) SYSTEM FOR TRANSFERRING MOTION PICTURE DATA BETWEEN PERIPHERAL DEVICE INTERFACES BY SECOND PERIPHERAL INTERFACE ISSUING DATA TRANSACTION BASED ON INFORMATION SET BY PROCESSOR TO DESIGNATE FIRST PERIPHERAL INTERFACE

(75) Inventor: Yasuhiro Ishibashi, Tokyo (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/950,070

(22) Filed: Oct. 14, 1997

(30) Foreign Application Priority Data

Nov. 14, 1996 (JP) ...................................... 8-302985

(51) Int. Cl.[7] .............................. G06F 13/14; G06F 13/20
(52) U.S. Cl. .............................. 710/33; 710/35; 713/200; 386/98; 386/126; 348/7; 455/6.3
(58) Field of Search .................... 455/6.3; 348/7; 386/98, 126; 710/35, 33; 713/200

(56) References Cited

U.S. PATENT DOCUMENTS

| 4,599,647 | * | 7/1986 | George et al. ......................... 358/122 |
| 5,473,385 | * | 12/1995 | Leske ................................... 348/500 |
| 5,566,306 | * | 10/1996 | Ishida ................................... 395/309 |
| 5,809,245 | * | 9/1998 | Zenda ............................. 395/200.47 |
| 5,842,111 | * | 11/1998 | Byers ................................... 455/6.3 |
| 5,898,891 | * | 4/1999 | Meyer ................................... 395/853 |

FOREIGN PATENT DOCUMENTS

| 401134654A | * | 5/1989 | (JP) ................................. G06F/1/38 |
| 7-302073 | | 11/1995 | (JP) . |
| 8-44657 | | 2/1996 | (JP) . |
| 8-190622 | | 7/1996 | (JP) . |

* cited by examiner

*Primary Examiner*—Thomas Lee
*Assistant Examiner*—Rehana Perveen
(74) *Attorney, Agent, or Firm*—Pillsbury Winthrop LLP

(57) ABSTRACT

A master transaction control unit capable of starting an I/O read transaction is arranged in a DVD decoder, and a DVD control driver controls both the DVD decoder and a DVD interface. With this arrangement, motion picture data can be directly transferred from the DVD interface to the DVD decoder without the mediacy of a main memory. Therefore, the same data can be prevented from being output onto a PCI bus several times, and the bus traffic can be reduced. Because of a transfer scheme without the mediacy of the main memory, illegal copying can be prevented.

19 Claims, 4 Drawing Sheets

SYSTEM FOR TRANSFERRING MOTION PICTURE DATA BETWEEN PERIPHERAL DEVICE INTERFACES BY SECOND PERIPHERAL INTERFACE ISSUING DATA TRANSACTION BASED ON INFORMATION SET BY PROCESSOR TO DESIGNATE FIRST PERIPHERAL INTERFACE

BACKGROUND OF THE INVENTION

The present invention relates to a computer system and a motion picture transfer method and, more particularly, to a computer system having a function of decoding and reproducing digitally compressed/encoded motion picture data, and a motion picture transfer method in this system.

In recent years, with the advance in computer technology, various multimedia personal computers have been developed. A personal computer of this type can reproduce not only text data and graphics data but also motion picture data and audio data.

Generally, motion picture data is compressed and encoded in accordance with the MPEG 1, and stored in a CD (Compact Disk). The motion picture data is decoded, displayed, and reproduced using a dedicated expansion board. As an expansion board for decoding, displaying, and reproducing motion picture data, e.g., "REAL Magic" available from Sigma Designs, Inc., USA is well known. This "REAL Magic" has a video decode function complying with the MPEG 1 standard. The decoded motion picture data is synthesized with VGA graphics received from a video card via a feature connector, and the synthesized motion picture is displayed.

The MPEG 1 standard, however, assumes the use of a CD having a data transfer rate of about 1.5 Mbps. Processing motion picture data containing a large amount of image data such as a movie leads to a degradation in image quality, and the like.

Recently, a DVD (Digital Versatile Disk) has been developed as a new-generation storage medium having a data transfer rate about ten times higher than that of the CD. The DVD has a new video disk standard capable of recording video data such as a movie with a high image quality on an optical disk having the same size as that of the CD by using motion picture coding called the MPEG 2. A recording/reproducing method for the DVD is based on variable rate coding in order to ensure both the image quality and the recording time with respect to the capacity. The size of variable-rate encoded data depends on the quality of an original image. A more abruptly changing scene results in a larger data size.

When video data stored in the DVD is to be reproduced on a personal computer, the data must be read from a DVD-ROM in the main memory of the computer, and transferred to a DVD decoder. In this case, if a DVD-ROM interface and the DVD decoder are constituted as a bus master device, the motion picture data can be transferred from the DVD-ROM to the main memory, and from the main memory to the DVD decoder by using the DMA scheme, thereby reducing the load of the CPU.

Even with the DMA scheme, when motion picture data is transferred via the main memory, as described above, the same data flows through the system bus twice (data transfer from the DVD-ROM to the main memory, and data transfer from the main memory to the DVD decoder). Accordingly, the traffic of the system bus increases.

In motion picture data transfer via the main memory, if the contents of a memory area used in the motion picture data transfer are written in another device, the motion picture data read from the DVD-ROM can be illegally copied. Therefore, a copy protect measure to prevent illegal copying must be adopted.

BRIEF SUMMARY OF THE INVENTION

It is an object of the present invention to provide a computer system and motion picture data transfer method capable of directly transferring motion picture data from a DVD-ROM interface to a DVD decoder without the mediacy of a main memory, and realizing a reduction in bus traffic and prevention of illegal copying.

According to the present invention, there is provided a computer system having a CPU, a system bus, and an interface connected to the system bus and allowed to control a port-addressable peripheral device for reading data from a storage medium storing digitally compressed/encoded motion picture data, comprising a motion picture decoding device connected to the system bus to decode the digitally compressed/encoded motion picture data, the motion picture decoding device including transaction control means for sending an I/O read transaction for reading the motion picture data from the interface onto the system bus, and motion picture transfer start means for starting direct transfer of the motion picture data from the interface to the motion picture decoding device, the motion picture transfer start means including first means for causing the CPU to send, to the interface, an instruction of reading motion picture data from the port-addressable peripheral device, and second means for causing the CPU to send an instruction of starting the I/O read transaction to the transaction control means.

In this computer system, since the transaction control means capable of starting the I/O read transaction is arranged in the motion picture decoding device, the motion picture decoding device can start not only a memory access transaction but also an I/O read transaction for reading motion picture data from the interface. The transfer of motion picture data from the interface to the motion picture decoding device is controlled by the motion picture transfer start means implemented by, e.g., a software driver for controlling both the interface and the motion picture decoding device. More specifically, the CPU sends, to the interface, an instruction of reading motion picture data from the port-addressable peripheral device, and an instruction of starting the I/O read transaction to the motion picture decoding device. With this processing, the motion picture data can be directly transferred from the interface to the motion picture decoding device without the mediacy of the main memory. A reduction in bus traffic and prevention of illegal copying can be realized.

As described above, according to the present invention, the motion picture data can be directly transferred from the DVD-ROM interface to the DVD decode without the mediacy of the main memory. A reduction in bus traffic and prevention of illegal copying can be realized.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will be described below with reference to the several views of the accompanying drawing.

Figure 1:
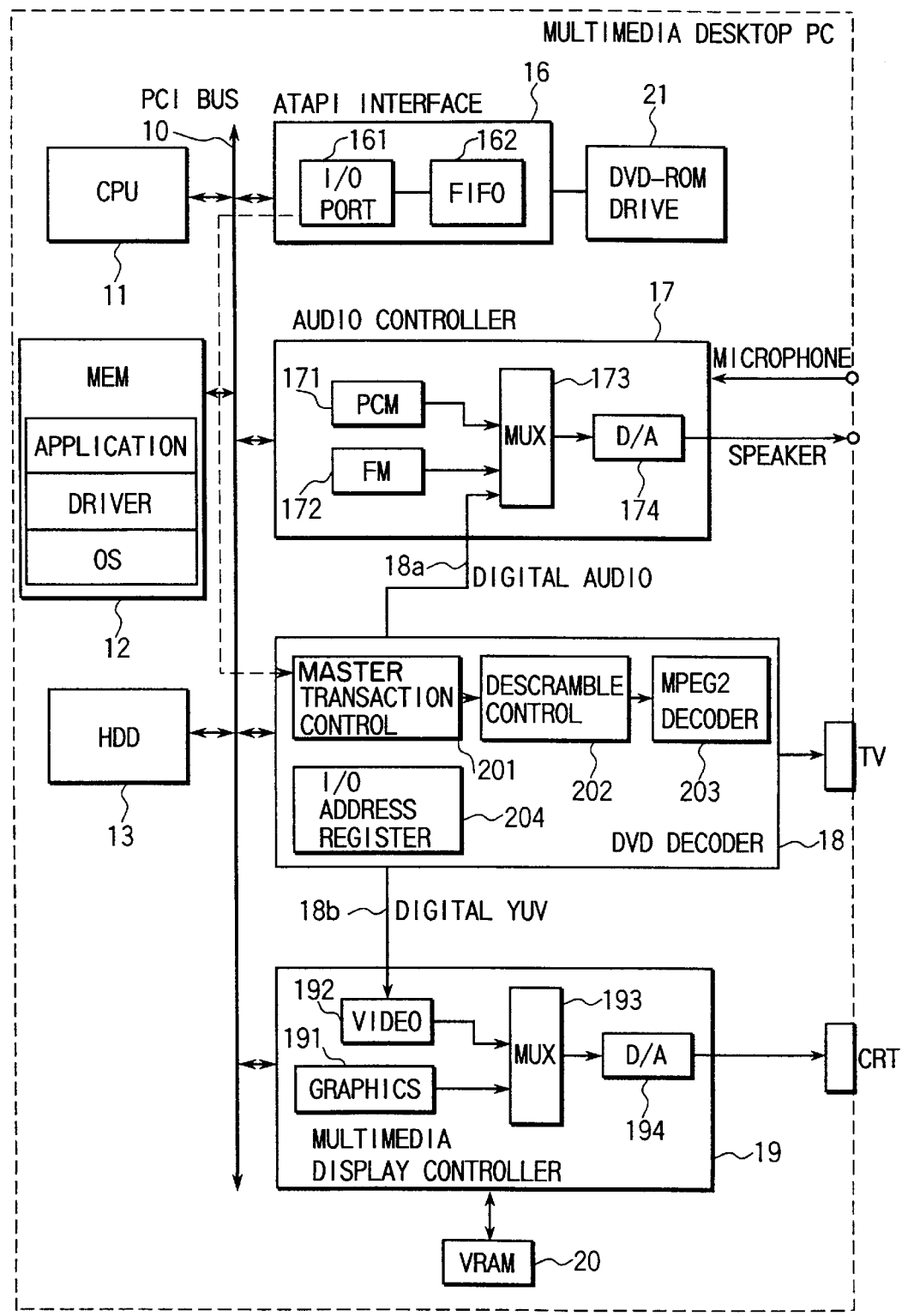
FIG. 1 is a block diagram showing the arrangement of a computer system according to an embodiment of the present inventions.

FIG. 1 shows the system arrangement of a personal computer according to an embodiment of the present invention. This system conforms to a desktop personal computer, which comprises a PCI bus 10, a CPU 11, a main memory (MEM) 12, an HDD 13, a DVD interface 16 constituted by an ATAPI or SCSI interface, an audio controller 17, a DVD decoder 18, a multimedia display controller 19, and a video memory (VRAM) 20, as shown in FIG. 1. A DVD-ROM drive 21 storing motion picture data encoded in accordance with the MPEG 2, and the like is connected to the DVD interface 16.

The DVD-ROM drive 21 reads a data stream stored in a DVD having a storage capacity of about 10 GB for two disk surfaces at a maximum transfer rate of 10.8 Mbps. More specifically, a time stamp representing the read time is written in the data stream recorded on the DVD medium for each sector having a fixed length (2,048 bytes). The DVD-ROM drive 21 measures the time based on clocks, and at the time designated by a certain time stamp, reads a corresponding sector at a transfer rate of 10.8 Mbps.

Figure 2:
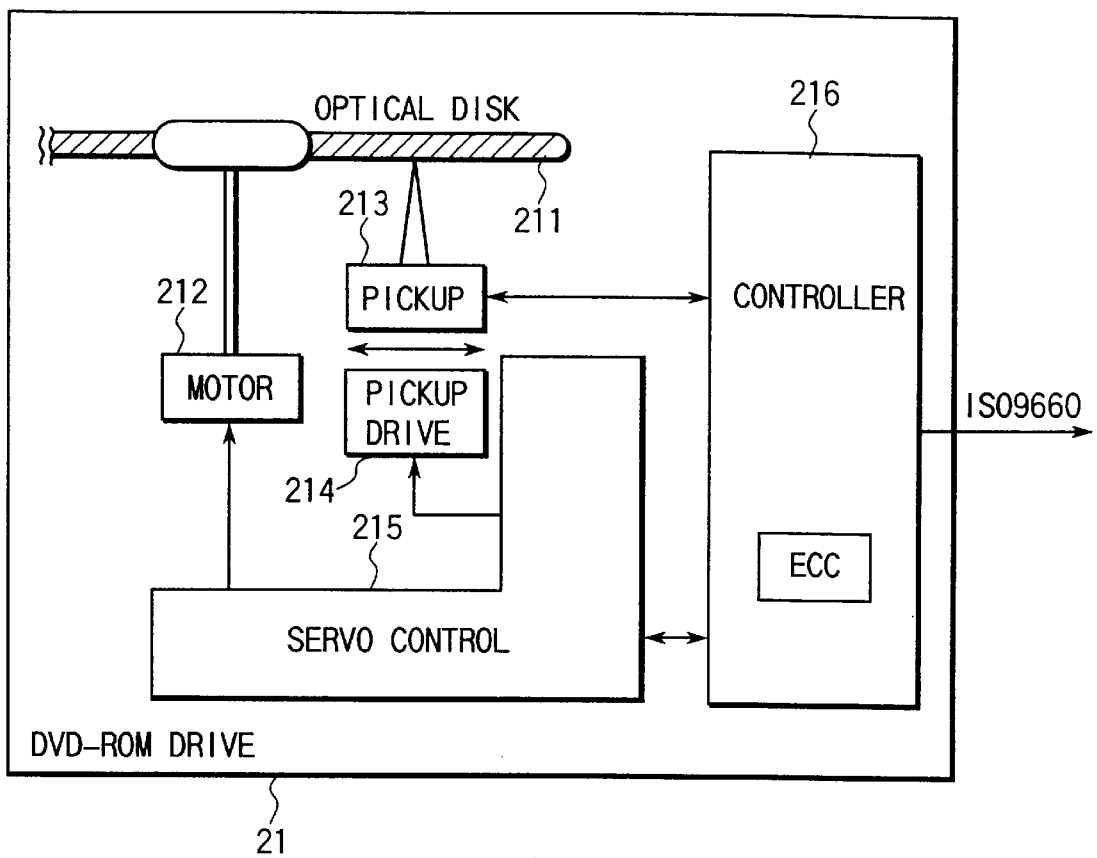
FIG. 2 is a block diagram showing the arrangement of a DVD-ROM drive used in the system of this embodiment.

As shown in FIG. 2, the DVD-ROM drive 21 is constituted by a DVD medium 211 constituted by an optical disk, a motor 212, a pickup 213, a pickup drive 214, a servo controller 215, and a drive controller 216 including an ECC circuit for detecting and correcting an error. The motor 212, the pickup 213, the pickup drive 214, the servo controller 215, and the drive controller 216 function as a drive device for driving the DVD medium 211 and reading data recorded on the DVD medium 211.

A movie about 135 minutes long can be recorded on one surface of the DVD medium 211. The movie data can include a main video image (video), sub video images (sub pictures) for up to 16 channels, and sounds (audio) for up to 8 channels.

In this case, the video, sub picture, and audio are digitally compressed and encoded in accordance with the MPEG 2 standard. In the MPEG 2 standard, data encoded by the MPEG 2 can include another encoded data. These encoded data are treated as one MPEG 2 program stream (digital data sequence).

The video is encoded using the MPEG 2, while the sub picture and audio are respectively encoded using runlength coding and the DOLBY AC3. Also in this case, these encoded video, sub picture, and audio are treated as one MPEG 2 program stream.

Coding processing using the MPEG 2 standard is variable rate coding, in which the data amount to be recorded/reproduced per unit time can be changed. Therefore, a more abruptly changing scene can have a higher transfer rate of the MPEG stream constituting a corresponding frame group, thereby reproducing a high-quality motion picture.

Figure 3:
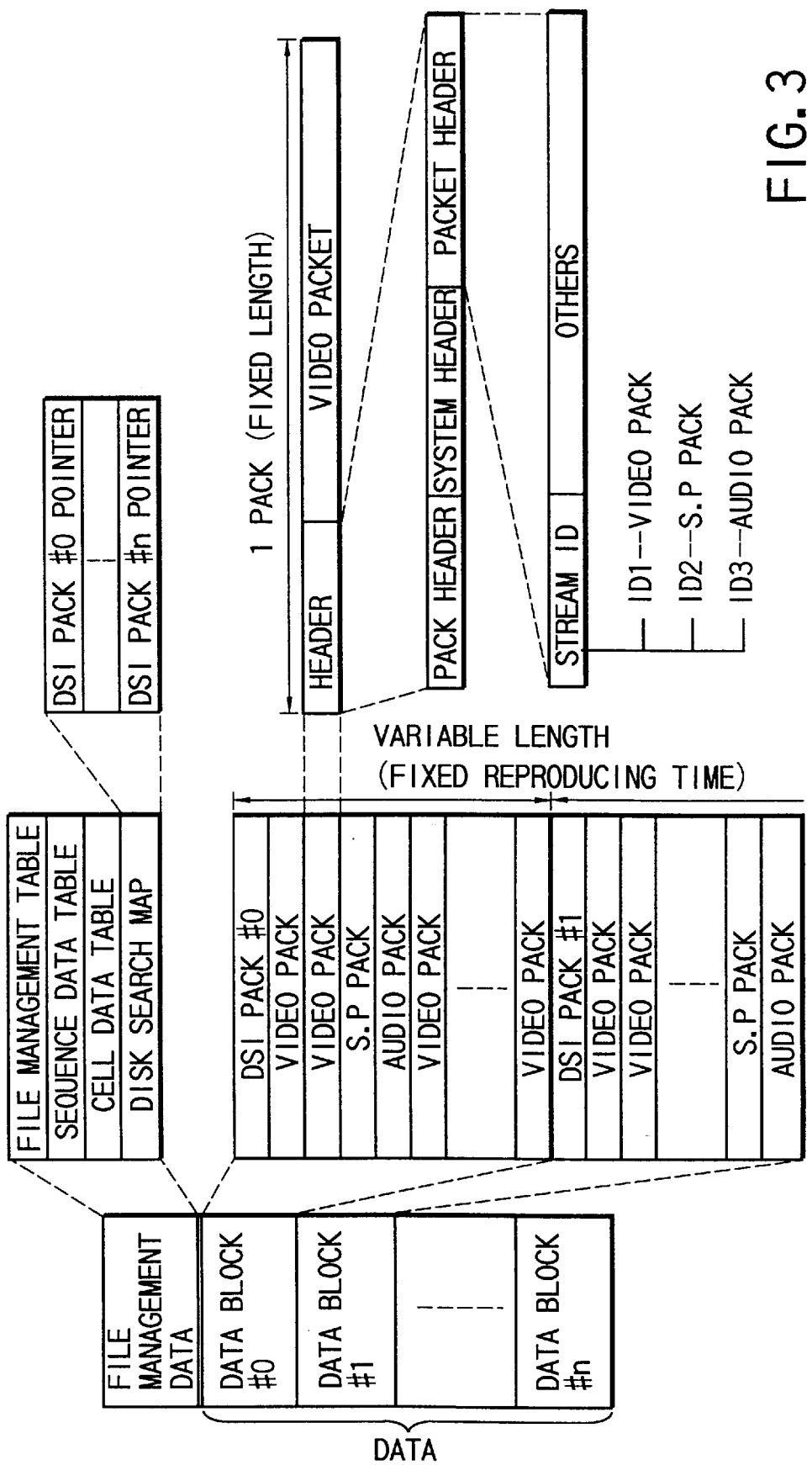
FIG. 3 is a view showing an example of the recording format of motion picture data used in the system of this embodiment.

To utilize the feature of the MPEG 2, in this embodiment, video data is recorded on the DVD medium 211 by using a data format like the one shown in FIG. 3.

As shown in FIG. 3, one video data is constituted by a file management data portion and a data portion. The data portion includes many data blocks (blocks #0 to #n). Each data block has a DSI (Disk Search Information) pack at its head end. A portion from a certain DSI pack to the next DSI pack serves as one data block. The storage location of each DSI pack is managed by disk search map data of the file management data portion.

One data block constitutes data corresponding to 15 frames necessary for reproducing a motion picture having a predetermined time, e.g., 0.5 sec, and is equivalent to GOP (Group Of Picture). On each data block, a video pack (VIDEO pack), a sub picture pack (S.P pack), and an audio pack (AUDIO pack) are multiplexed and recorded. These video pack (VIDEO pack), sub picture pack (S.P pack), and audio pack (AUDIO pack) are the data units of encoded video, sub picture, and audio. The data size of each pack corresponds to the above-described sector size, and are fixed. However, the number of packs one data block can include is variable. Therefore, a data block corresponding to an active scene includes a larger number of video packs.

Each of the video, sub picture, and audio packs is constituted by a header portion and a packet portion (video, sub picture, or audio packet). The packet portion is encoded data itself. The header portion is constituted by a pack header, a system header, and a packet header. In the packet header, a stream ID representing whether a corresponding packet is a video, sub picture, or audio packet is registered.

Encoded data to be recorded on the DVD, e.g., encoded data in an arbitrary sector is scrambled using a predetermined encryption algorithm. With this processing, even if video data is illegally copied, it cannot be easily used.

The DVD has a multi-story function of selecting a scene group corresponding to a scenario designated by the user from a plurality of scenarios, and reproducing it, and a multi-angle function of selecting the video image of an angle designated by the user from a plurality of video images having different photographing angles, and reproducing it.

These functions are realized by multiplexing a plurality of video images corresponding to multi stories and multi angles in units of, e.g., data blocks, and managing the locations and relations of the data blocks using disk search map data or the like in units of stories or angles.

Each unit of the system in FIG. 1 will be described below.

The CPU 11 controls the operation of the whole system, and executes an operating system stored in the system memory (MEM) 12, and the program of an application to be executed. Data recorded in the DVD-ROM drive 21 is transferred and reproduced by executing a DVD control driver by the CPU 11.

The DVD interface 16 is a disk interface for connecting a disk unit such as an HDD or a CD-ROM to the PCI bus 10.

In this embodiment, the DVD interface 16 performs data transfer between the CPU 11 and the DVD-ROM drive 21 in accordance with an instruction from the CPU 11. The DVD interface 16 comprises a FIFO buffer 162 for temporarily holding data read from the DVD-ROM drive 21, and an I/O port 161 for reading the data of the FIFO buffer 162 onto the PCI bus 10. The I/O port 161 is constituted by an I/O register from which data can be read by a bus master device for sending an I/O read transaction onto the PCI bus 10.

The audio controller 17 controls the input/output of sound data under the control of the CPU 11, and comprises a PCM sound source 171, an FM sound source 172, a multiplexer 173, and a D/A converter 174 in order to output the sound. The multiplexer 173 receives outputs from the PCM sound source 171 and the FM sound source 172, and digital audio data transferred from the DVD decoder 18, and selects one of them.

The digital audio data is obtained by decoding audio data read from the DVD-ROM drive 21. The digital audio data is transferred from the DVD decoder 18 to the audio controller 17 by using not the PCI bus 10 but an audio bus 18a. Therefore, the digital audio data can be transferred at a high speed without influencing the performance of the computer system.

The DVD decoder 18 reads an MPEG 2 program stream from the DVD interface 16 under the control of the CPU 11. After dividing the MPEG 2 program stream into video, sub picture, and audio packets, the DVD decoder 18 decodes, synchronizes, and outputs them. The DVD decoder 18 is implemented as, e.g., a PCI expansion card freely detachable from the PCI expansion slot of this computer system. As shown in FIG. 1, the DVD decoder 18 comprises a master transaction control unit 201, a descramble control unit 202, an MPEG 2 decoder 203, and an I/O address register 204.

The master transaction control unit 201 operates the DVD decoder 18 as a bus master (initiator) for sending a transaction onto the PCI bus 10, and executes an I/O read transaction for reading motion picture data from the DVD interface 16. In this case, the I/O read transaction is constituted by an address phase for designating the I/O port 161 of the DVD interface 16, and one or more subsequent data transfer phases. By burst transfer, the motion picture data can be read. An I/O address value designating the I/O port 161 is set in the I/O address register by the CPU 11.

Figure 6:
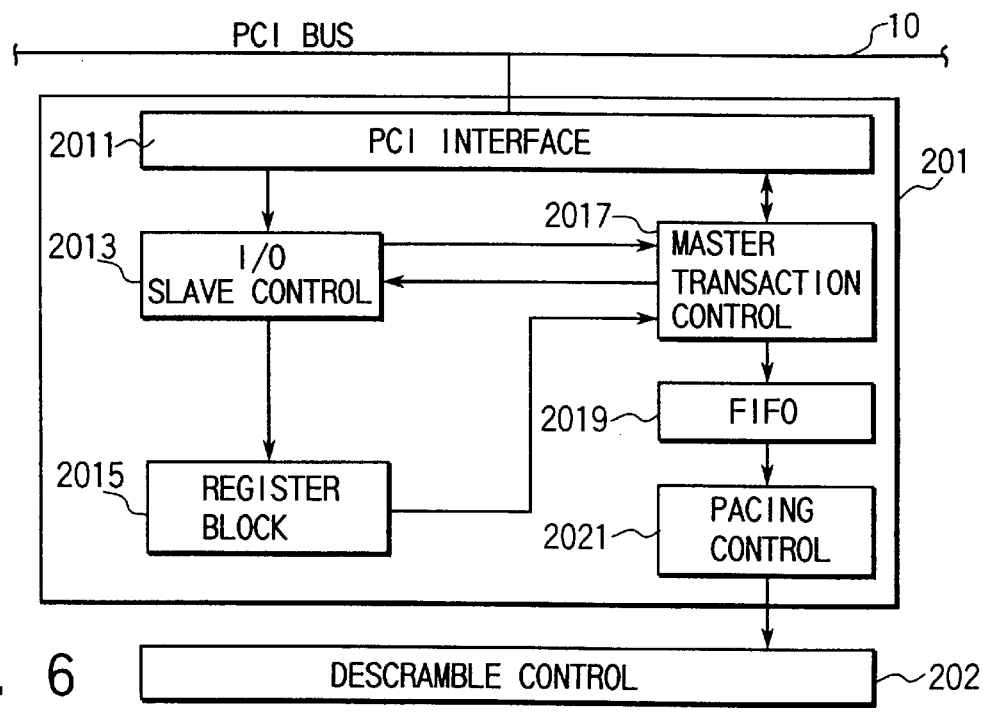
FIG 6 is a block diagram showing in detail a master transaction control unit 201 shown in FIG. 1.

FIG. 6 is a block diagram showing the master transaction control unit 201 in detail. As shown in FIG. 6, the master transaction control unit 201 is constituted by a PCI interface 2011, an I/O slave control circuit 2013, a register block 2015, a master transaction control circuit 2017, a FIFO circuit 2019, and a pacing control circuit 2021. When motion picture data is to be read from the DVD interface 16, the internal driver of the memory 12 instructs the I/O slave control circuit 2013 via a PCI interface for controlling the protocol of the PCI about the port address of a peripheral device, i.e., the port address of the I/O port 161 in this embodiment and the number of transfer bytes. These parameters are held in the register block 2015. In response to the instruction from the driver, the I/O slave control circuit 2013 outputs a start instruction to the master transaction control circuit 2017. In response to this instruction, the master transaction control circuit 2017 outputs a read command to the PCI interface 2011. In response to this read command, the PCI interface 2011 obtains the bus, and outputs an address (the address of the I/O port 161 and a read command) to read data. The number of bytes of data to be transferred depends on the size of a cache memory arranged in the ATAPI interface 16. The read data is stored in the FIFO circuit 2019. After the data is temporarily stored in the FIFO circuit 2019, the pacing control circuit 2021 controls the data transfer rate so as to output the data at a data transfer rate required by the descramble control unit 202 because the transfer rate (e.g., as high as 40 Mbps) of data read from the DVD interface 16 is different from the transfer rate (e.g., 10.08 Mbps) of data output to the descramble control unit 202.

The MPEG 2 program stream read by the master transaction control unit 201 is sent to the MPEG 2 decoder 203 via the descramble control unit 202. The descramble control unit 202 executes descramble processing of decoding and descrambling the scrambled data included in the MPEG 2 program stream. The MPEG 2 decoder 203 divides the MPEG 2 program stream into video, sub picture, and audio packets, and decodes them.

The decoded audio data is transferred as digital audio data to the audio controller 17 via the audio bus 18a, as described above. The decoded video and sub picture are synthesized and sent as digital YUV data to the multimedia display controller 19. In this case, the digital YUV data is transferred from the DVD decoder 18 to the multimedia display controller 19 by using not the PCI bus 10 but a video bus 18b. Therefore, the digital YUV data can also be transferred at a high speed without influencing the performance of the computer system, similar to the digital audio data.

As the video bus 18b, a VESA-standard VAFC (VESA Advanced Feature Connector), or a VM-Channel (VESA Media Channel) can be used.

The DVD decoder 18 also has a function of converting digital YUV data and audio data into a TV signal having the NTSC scheme, and outputting the TV signal to the external video input of a TV receiver. The TV signal can be easily transmitted from the DVD decoder 18 to the TV receiver by connecting a cable extending to the TV receiver to a connector arranged on the card of the DVD decoder 18.

The multimedia display controller 19 controls a CRT display used as the display monitor of this system under the control of the CPU 11, and supports display of a text and graphics having the VGA specification, and in addition, display of a motion picture.

As shown in FIG. 1, the multimedia display controller 19 comprises a graphics display control circuit (Graphics) 191, a video display control circuit 192, a multiplexer 193, a D/A converter 194, and the like.

The graphics display control circuit 191 is a VGA-compatible graphics controller, which converts the VGA graphics data stored in the video memory (VRAM) 20 into RGB video data, and outputs the RGB video data. The video display control circuit 192 has a video buffer for storing digital YUV data, a YUV-RGB conversion circuit for converting YUV data stored in this buffer into RGB video data, and the like.

The multiplexer 193 selects one of output data from the graphics display control circuit 191 and the video display control circuit 192, or synthesizes VGA graphics from the graphics display control circuit 191 and a video output from the video display control circuit 192, and sends them to the D/A converter 194. The D/A converter 194 converts the video data from the multiplexer 193 into an analog RGB signal, and outputs the signal to the CRT display.

Figure 4:
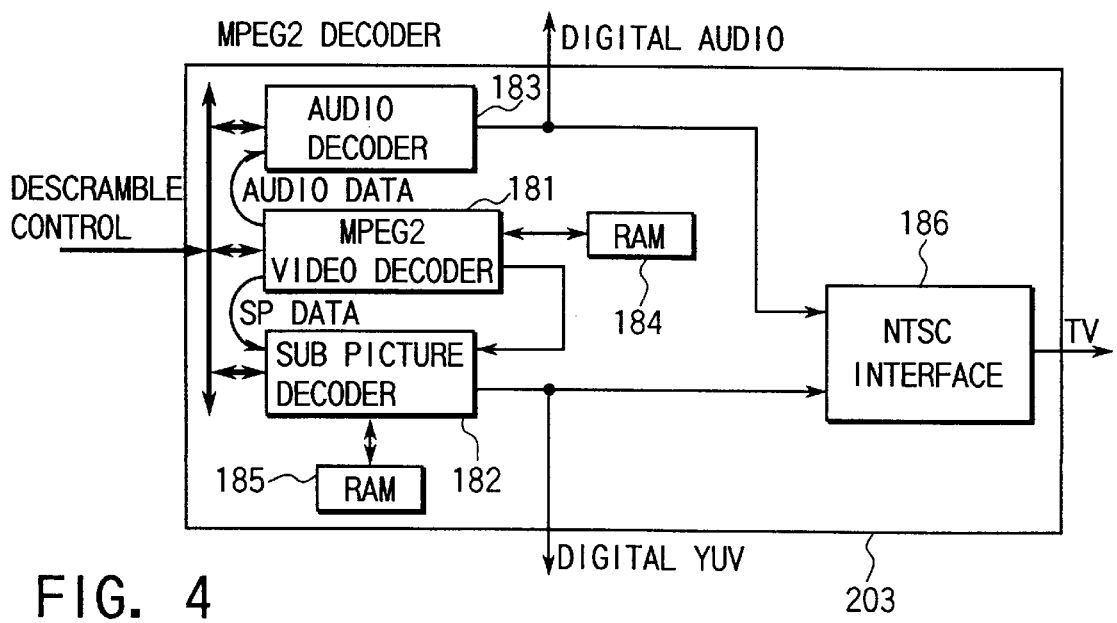
FIG. 4 is a block diagram showing an example of the detailed arrangement of an MPEG 2 decoder arranged inside a DVD decoder used in the system of this embodiment.

FIG. 4 shows a detailed arrangement of the MPEG 2 decoder 203.

In order to synchronously decode and reproduce multiplexed video, sub picture, and audio bit streams, the MPEG 2 decoder 203 comprises three decoders corresponding to the video, sub picture, and audio, i.e., an MPEG 2 video decoder 181, a sub picture decoder 182, and an audio decoder 183.

These MPEG 2 video decoder 181, sub picture decoder 182, and audio decoder 183 are coupled via an internal bus. The MPEG 2 video decoder 181 and sub picture decoder 182 respectively have RAMs 184 and 185 used for decode processing or the like.

The MPEG 2 video decoder 181 decodes video data contained in the multiplexed MPEG stream received via the descramble control unit 202. By using the stream ID described with reference to FIG. 3, the MPEG 2 video decoder 181 divides the received MPEG stream into videos, sub pictures, and audios in units of packs, and decodes the video packs. The sub picture and audio packs separated by the MPEG 2 video decoder 181 are respectively sent to the sub picture and audio decoders 182 and 183.

The sub picture decoder 182 decodes the sub picture pack separated by the MPEG 2 video decoder 181. The type of decode processing executed by the sub picture decoder 182 corresponds to coding processing performed for the sub picture, i.e., runlength coding. The sub picture decoder 182 further receives the video decoded by the MPEG 2 video decoder 181, and synthesizes the video with the sub picture decoded by the sub picture decoder 182. The synthesis location of the sub picture is determined by location data included in the header portion added to the sub picture packet. The synthesized data is output as digital YUV data.

The audio decoder 183 decodes the audio pack separated by the MPEG 2 video decoder 181. The type of decode processing executed by the audio decoder 183 corresponds to coding processing performed for audio data, i.e., the DOLBY AC3. The decoded audio packet is output as digital audio data.

As described above, the digital YUV data and the digital audio data are sent to the display controller 19 and the audio controller 17, and also to an NTSC interface 186 where they are converted into a TV signal.

Figure 5:
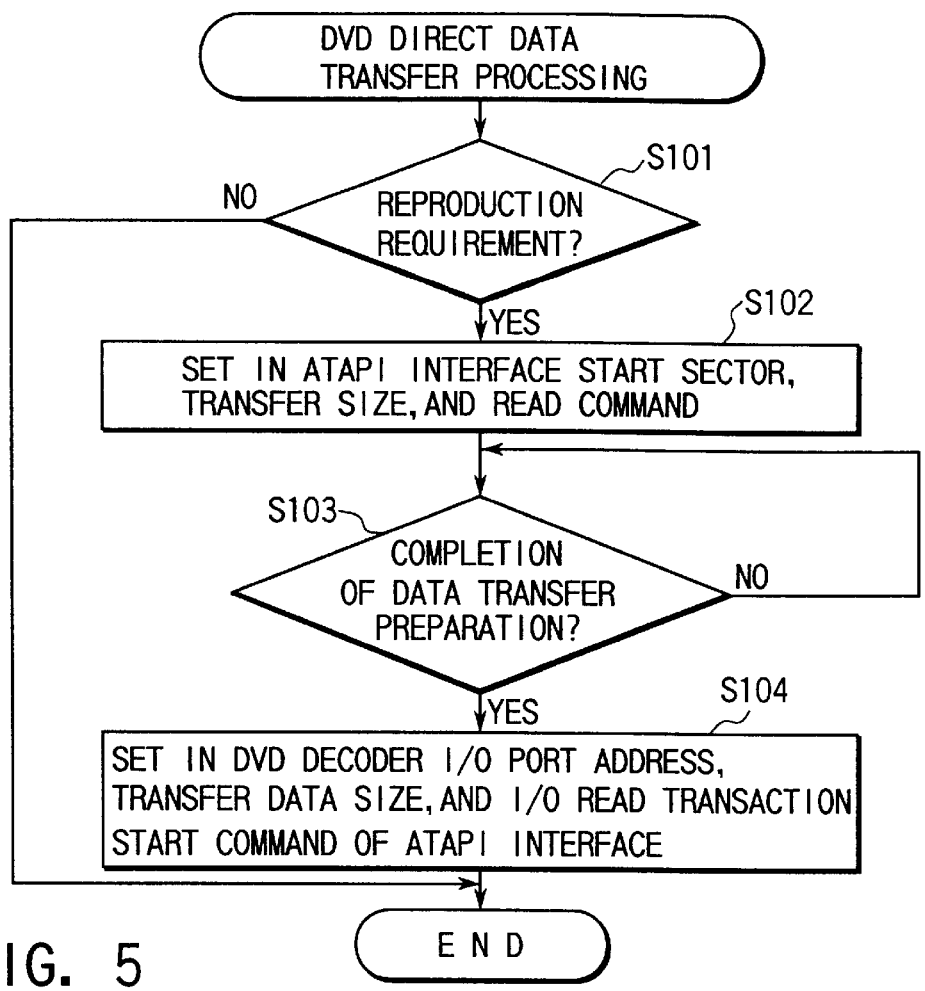
FIG 5 is a flow chart showing the procedure of controlling direct motion picture transfer which is used in the system of this embodiment.

The processing procedure of the DVD control driver for controlling direct transfer of motion picture data from the DVD interface 16 to the DVD decoder 18 will be described below with reference to a flow chart in FIG. 5.

If a motion picture data reproduction requirement is sent from a motion picture data reproduction application program (step S101), the DVD control driver sets a start sector, a transfer data size, and a read command in the DVD interface 16 to start reading data from the DVD-ROM drive 21 (step S102). If completion of data transfer preparation by the DVD interface 16 is detected on the basis of a hardware interrupt from the DVD interface 16 to the CPU 11 or polling of the CPU 11 (step S103), the DVD control driver sets the I/O address of the I/O port 161, a transfer data size, and an I/O read transaction start command in the DVD decoder 18, and causes the master transaction control unit 201 to start the I/O read transaction for reading motion picture data from the DVD interface 16 (step S104). With this processing, the motion picture data is directly transferred from the DVD interface 16 to the DVD decoder 18.

As has been described above, in this embodiment, the master transaction control unit 201 capable of E starting the I/O read transaction is arranged in the DVD decoder 18, and the DVD control driver controls both the DVD decoder 18 and the DVD interface 16. With this arrangement, motion picture data can be directly transferred from the DVD interface 16 to the DVD decoder 18 without the mediacy of the main memory 12. Therefore, the same data can be prevented from being output onto the PCI bus 10 several times, and the bus traffic can be reduced. Because of the transfer scheme without the mediacy of the main memory 12, illegal copying can be prevented.

The above embodiment has exemplified the computer system having the disk drive device and the disk interface. However, the present invention is not limited to the above-described embodiment, and can be applied to any peripheral device as far as the port address can be designated. In addition, the interface is not limited to a disk interface such as an ATAPI interface or a SCSI interface, and can be an interface of any type (e.g., a LAN interface).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

What is claimed is:

1. A computer system comprising:

a processor;

a system bus connected to the processor;

a first peripheral device interface connected between the system bus and a first peripheral device;

a register for storing information comprising an address of the first peripheral device interface set by the processor;

a second peripheral device interface, connected between the system bus and a second peripheral device, for issuing a data transaction between the first and second peripheral device interfaces based on the information stored in the register.

2. The computer system according to claim 1, wherein said first peripheral device interface comprises an I/O interface connected between the system bus and an external device, which reads out encoded data from a medium, and said second peripheral device comprises a decoder having a decode section for decoding the encoded data transferred from the I/O interface.

3. The computer system according to claim 2, wherein said transaction controller issues a read transaction such that the encoded data from the I/O interface is transferred to the decoder through the system.

4. The computer system according to claim 2, wherein said I/O interface comprises:

a buffer for temporarily storing the encoded data read out by the external device; and an I/O port for transmitting the encoded data stored in the buffer to the system bus, the information stored in said register comprising an address of the I/O port and an amount of data transferred.

5. The computer system according to claim 1, wherein said data transfer comprises a burst transfer.

6. The computer system according to claim 2, wherein said I/O interface controls the external device to read out the encoded data from the medium, in accordance with commands from the processor.

7. The computer system according to claim 2, wherein said I/O interface comprises a digital versatile disk drive interface.

8. The computer system according to claim 2, wherein said system bus comprises a peripheral component interconnect (PCI) bus, and said decoder comprises a PCI interface for acquiring the PCI bus.

9. The computer system according to claim 7, wherein said PCI interface receives a read command issued from said transaction controller, and acquires the PCI bus in response to issuance of the read command, and reads out the encoded data from the I/O interface based on the information stored in the register.

10. The computer system according to claim 2, wherein said decoder further comprises a pacing section for pacing a transfer rate of the data transfer from the system bus to the decoder, in accordance with another transfer rate used in the decoder.

11. The computer system according to claim 2, wherein said decoder further comprises a code descramble section for descrambling the encoded data, which is scrambled beforehand.

12. A decoder connected to a system bus and used as a second peripheral device, comprising:
    a register for storing information comprising an address of a first peripheral device interface set by a processor;
    a second peripheral device interface, connected between the system bus and the decoder, for issuing data transaction between the first and the second peripheral device interface based on the information stored in the register; and
    a decode section for decoding an encoded data subject to the data transfer by the second peripheral device interface.

13. The decoder according to claim 11, wherein said system bus comprises a peripheral component interconnect (PCI) bus, and said decoder further comprises a PCI interface for acquiring the PCI bus.

14. The decoder according to claim 12, wherein said transaction controller issues a read command to be supplied to the PCI bus interface, and said PCI bus interface acquires the PCI bus in response to the read command being issued, and reads out the encoded data from said second peripheral device interface based on the information stored in the register.

15. The decoder according to claim 11, further comprising a pacing section for pacing a transfer rate of the data transfer from the system bus to the decoder in accordance with another transfer rate used in the decoder.

16. The decoder according to claim 11, further comprising a code decoding section for decoding the encoded data, which is encoded beforehand.

17. A method for use in a computer system comprising: a processor; a system bus connected to the processor; and first and second peripheral device interfaces connected to the system bus, said method comprising the steps of:
    causing the processor to set the second peripheral device interface with information required for designating the first peripheral device interface; and
    causing the second peripheral device interface to issue a data transaction through the system bus in accordance with the information.

18. The method according to claim 17, wherein said data transfer comprises a burst transfer.

19. A computer system comprising:
    a processor;
    a system bus connected to the processor;
    a first peripheral device interface connected between the system bus and a first peripheral device;
    a register connected to the system bus; and
    a second peripheral device interface connected between the system bus and a second peripheral device,
    wherein an address of the first peripheral device interface is transmitted from the processor to the register, and the second peripheral device interface accesses the first peripheral device interface based on the address stored in the register, so as to acquire data from the first peripheral device through the first peripheral device interface.

* * * * *